(12) United States Patent
Foscan

(10) Patent No.: US 7,077,607 B2
(45) Date of Patent: Jul. 18, 2006

(54) KEY CUTTING MACHINE

(75) Inventor: Eros Foscan, Mareno di Piave (IT)

(73) Assignee: Key Line S.R.L., Conegliano (IT)

( * ) Notice: Subject to any disclaimer, the term of this patent is extended or adjusted under 35 U.S.C. 154(b) by 0 days.

(21) Appl. No.: 11/024,144

(22) Filed: Dec. 28, 2004

(65) Prior Publication Data

US 2006/0051173 A1    Mar. 9, 2006

(30) Foreign Application Priority Data

Sep. 6, 2004   (IT) .......................... PN2004A0064

(51) Int. Cl.
B23C 3/35     (2006.01)
B23C 5/26     (2006.01)

(52) U.S. Cl. .......................... 409/84; 409/81; 409/82; 409/232; 409/218; 279/156; 408/239 A

(58) Field of Classification Search ............ 409/81–84, 409/131–132, 231–234, 218, 210, 214; 408/239 A, 408/239 R; 279/156
See application file for complete search history.

(56) References Cited

U.S. PATENT DOCUMENTS

| | | | | |
|---|---|---|---|---|
| 3,540,748 A | * | 11/1970 | Buck ......................... | 279/156 |
| 4,411,567 A | * | 10/1983 | Agius ........................ | 409/82 |
| 4,426,179 A | | 1/1984 | Jefferson | |
| 4,614,465 A | * | 9/1986 | Wu .............................. | 409/81 |
| 4,687,389 A | | 8/1987 | Santii et al. | |
| 4,907,919 A | * | 3/1990 | Lee .............................. | 409/81 |
| 5,035,556 A | * | 7/1991 | Lamotte et al. ............. | 409/218 |
| 5,782,591 A | * | 7/1998 | Wilkinson, Jr. ............. | 409/131 |
| 5,833,406 A | * | 11/1998 | Chies et al. .................. | 409/81 |
| 6,641,339 B1 | | 11/2003 | Chies et al. | |
| 6,964,547 B1 | * | 11/2005 | Stojanovski ................ | 409/233 |
| 6,971,825 B1 | * | 12/2005 | Stojanovski ................ | 409/233 |

FOREIGN PATENT DOCUMENTS

| | | |
|---|---|---|
| EP | 0 562 490 A1 | 9/1993 |
| EP | 0 746 439 B1 | 8/1997 |
| FR | 2173004 | 10/1973 |
| FR | 2199493 | 4/1974 |
| FR | 2306043 | 10/1976 |
| WO | WO 95/23666 | 9/1995 |

* cited by examiner

*Primary Examiner*—Erica Cadugan
(74) *Attorney, Agent, or Firm*—Fay, Sharpe, Fagan, Minnich & McKee, LLP

(57) ABSTRACT

A key cutting machine for the cutting of keys includes a spindle adapted to be driven rotatably about an axis thereof. The spindle has an axially extending throughbore. A milling cutter is selectively mountable in the throughbore for corotation therewith. A carriage for supporting a clamp assembly is movable relative to the spindle in a plane that is orthogonal relative to the axis. A key blank is clamped in the clamp assembly for cutting by the milling cutter. A securing mechanism is disposed on the spindle for rigidly mounting the milling cutter to the spindle when the milling cutter is positioned adjacent a first spindle end. A stem is selectively receivable in the throughbore by axial insertion into a second spindle end to position the milling cutter adjacent the first spindle end. The stem is removable from the throughbore after the milling cutter is rigidly mounted to the spindle by the securing mechanism.

21 Claims, 5 Drawing Sheets

KEY CUTTING MACHINE

CROSS-REFERENCE(S) TO RELATED APPLICATION(S)

This application is related to the U.S. Patent Application entitled "CLAMP FOR A KEY CUTTING MACHINE", Ser. No. 11/024,219, filed concurrently herewith and expressly incorporated herein by reference. The current application claims priority from Foreign Patent Application No. PN2004A000064 filed Sep. 6, 2004.

BACKGROUND

The present invention relates to a key cutting machine for the cutting of keys or key blanks and, more particularly, to a key cutting machine for the cutting of "laser-type" keys, which are often used in the automotive sector.

"Laser-type" keys typically include a shaped head portion and a flat shaft portion extending from the head portion. The flat shaft portion is often referred to as the "blade". The blade has two opposite major surfaces which, in a laser-type key, are each cut by milling so as to cause them to correspond to a specific bit notch pattern, or ciphering. The bit notch pattern is essentially a mechanical code that is particular to each key. The bit notch pattern of a laser-type key can be a reproduction of an existing key's bit notch pattern or a new bit notch pattern generated by computer code or the like.

Conventional key cutting machines generally include a base or bedplate, on which there are mounted two jaw fixtures or clamps. A first clamp is typically used to hold a master key that is to be duplicated and a second clamp is typically used to hold a key blank to be cut or ciphered. The conventional key cutting machines further include a vertically movable tool-carrying carriage that is provided with a first spindle for holding a milling cutter that cuts the key blank and a second spindle for holding a tracer point or feeler that traces or feels the bit notch pattern of the master key.

These conventional key cutting machines have a number of drawbacks, some of which derive from the multiplicity of tools that have to be used to create and/or duplicate the wide variety of key types that are typically used by the various motor-vehicle manufacturers, as well as to cut other kinds of keys, such as for example punched-type keys, suitable for other applications. Replacing these tools in a conventional key cutting machine is a rather cumbersome, complicated and, above all, quite delicate and critical operation to be carried out. This is owed to the need for alignment of the milling cutter and the tracer point along their respective vertical axes, and with reference to a same horizontal plane, to be set and adjusted manually to a highest degree of accuracy. This alignment operation is preferably, and often necessarily, carried out by appropriately skilled personnel and usually takes quite long a time to be completed.

European patent publication EP 0 746 439 describes a key cutting machine, in which the vertically movable tool carriage supports a tracer point and a milling cutter by means of self-centering grippers that are connected to two respective inputs of a logic coincidence circuit. The self-centering gripper of the milling cutter is associated to a threaded shank that is firmly joined to an actuating handle and is housed within a tubular support provided with a radial cavity, into which there is adapted to engage a radial pin that is movable axially relative to the structure of the tool carriage as actuated from the outside.

The machine described in the '439 publication purportedly enables both the tracer point and the milling cutter to be more quickly replaced whenever either tool has to be replaced. It furthermore allows a greater operating accuracy over prior-art machines. However, the same machine still proves quite complicated considering that, apart from its making further use of two interchangeable fixtures, it still uses a vertically movable tool-holding carriage with the need for both the milling cutter and the tracer point to be set and adjusted manually as described above.

More recently there have been developed key cutting machines that are based on the use of an electronic control unit provided with memory means, in which, there are properly stored the characteristic data of the keys of the various motor-vehicle manufacturers, as well as keys for other kinds of locks. Duplicating or generating these keys therefore no longer requires the direct availability of a master key, since the coded data are retrieved from the memory of the electronic unit built into the machine and are duly set and entered by means of a control keyboard. This approach is effective in simplifying the fixture support and handling portion of the whole operation, but does not generally bring about any improvement as far as the tool settings and adjustment problem is concerned, which still uses a vertically movable tool-holding carriage.

SUMMARY

In accordance with one aspect, a key cutting machine is provided for the cutting of keys. More particularly, in accordance with this aspect, the key cutting machine includes a spindle adapted to be driven rotatably about an axis thereof. The spindle has an axially extending throughbore. A milling cutter is selectively mountable in the throughbore for corotation therewith. A carriage for supporting a clamp assembly is movable relative to the spindle in a plane that is orthogonal relative to the axis. A key blank is clamped in the clamp assembly for cutting by the milling cutter. A securing mechanism is disposed on the spindle for rigidly mounting the milling cutter to the spindle when the milling cutter is positioned adjacent a first spindle end. A stem is selectively receivable in the throughbore by axial insertion into a second spindle end to position the milling cutter adjacent the first spindle end. The stem is removable from the throughbore after the milling cutter is rigidly mounted to the spindle by the securing mechanism.

In accordance with another aspect, an improved key cutting machine is provided. More particularly, in accordance with this aspect, the key cutting machine includes a rotatably mounted spindle having a throughbore extending from a spindle first end to a spindle second end. A clamp assembly holds a key blank for cutting by a milling cutter rotatably mounted to the spindle in the throughbore adjacent the spindle first end. An elongated stem is insertable into the throughbore with the milling cutter temporarily attached at one end to position the milling cutter adjacent the spindle first end after insertion into the spindle second end. A securing mechanism selectively locks the milling cutter to the spindle when the stem positions the milling cutter adjacent the spindle first end.

In accordance with still another aspect, a method is provided for installing a milling cutter in a key cutting machine in an operable position. More particularly, in accordance with this aspect, a milling cutter is attached to one end of an elongated stem. The one end of the elongated stem with the milling cutter attached thereto is inserted into a spindle second end of a spindle of a key cutting machine to position the milling cutter adjacent a spindle first end. The milling cutter positioned adjacent the spindle first end is secured to the spindle. The stem is removed from the spindle. The spindle and the milling cutter secured thereto are rotatably driven to cut a key blank into a key.

In accordance with yet another aspect, a key cutting machine is provided for the duplication or generation of keys, in particular so-called "laser-type" keys. More particularly, in accordance with this aspect of the invention, the key cutting machine includes a mechanical machining unit connected to an electronic control unit having memory means for storing the coded data of the keys to be duplicated or generated. The mechanical machining unit includes, along with a tracer or key follower for tracking the bit notch pattern of the keys to be duplicated, a spindle and a milling cutter associated thereto. Both of the milling cutter and the spindle are adapted to be driven rotatably about the axis thereof.

The mechanical machining unit according to this aspect further includes a carriage on which there is mounted a jaw or clamp. The carriage is movable on a base-plate of the mechanical machining unit in a plane that is orthogonal to a plane of the milling cutter and the key follower or tracer. The milling cutter is temporarily attached to an end portion of a stem that is adapted to be inserted axially in the spindle through a back-side end portion of the latter. This enables the milling cutter to be fastened to the end portion of the spindle. The milling cutter is adapted to be brought into contact with a reference plane on the jaw or clamp so as to directly and readily achieve a correct setting and adjustment of the milling cutter in an operating position thereof.

In accordance with still yet another aspect, a key cutting machine is provided for the duplication or generation of "laser-type" keys. More particularly, in accordance with this aspect, the key cutting machine includes electronic control means which is extremely simple to set and adjust and safe to actuate, so as to be able to be operated by even generally unskilled personnel.

In accordance with another aspect, a key cutting machine is provided that includes the provision of semi-automatic setting and adjustment of one or more tools of the key cutting machine relative to a working plane thereof, so as to do away with the need for a movable tool-holding carriage heretofore used for this purpose.

In accordance with a further aspect, a key cutting machine is provided with means to make a milling cutter loading operation much more easy and quick by modifying the associated mode of operation and avoiding the use of self-centering spindles, so as to decisively improve the ergonomics of the machine.

In accordance with still a further aspect, a key cutting machine is provided with means to rationalize a working zone of the machine by providing stationary guarding means and a chip collecting pan to prevent machining chips from sailing out or being ejected outside, so as to ensure operator's safety and, furthermore, to make the machine particularly compact from a dimensional point of view.

DETAILED DESCRIPTION

Figure 1:
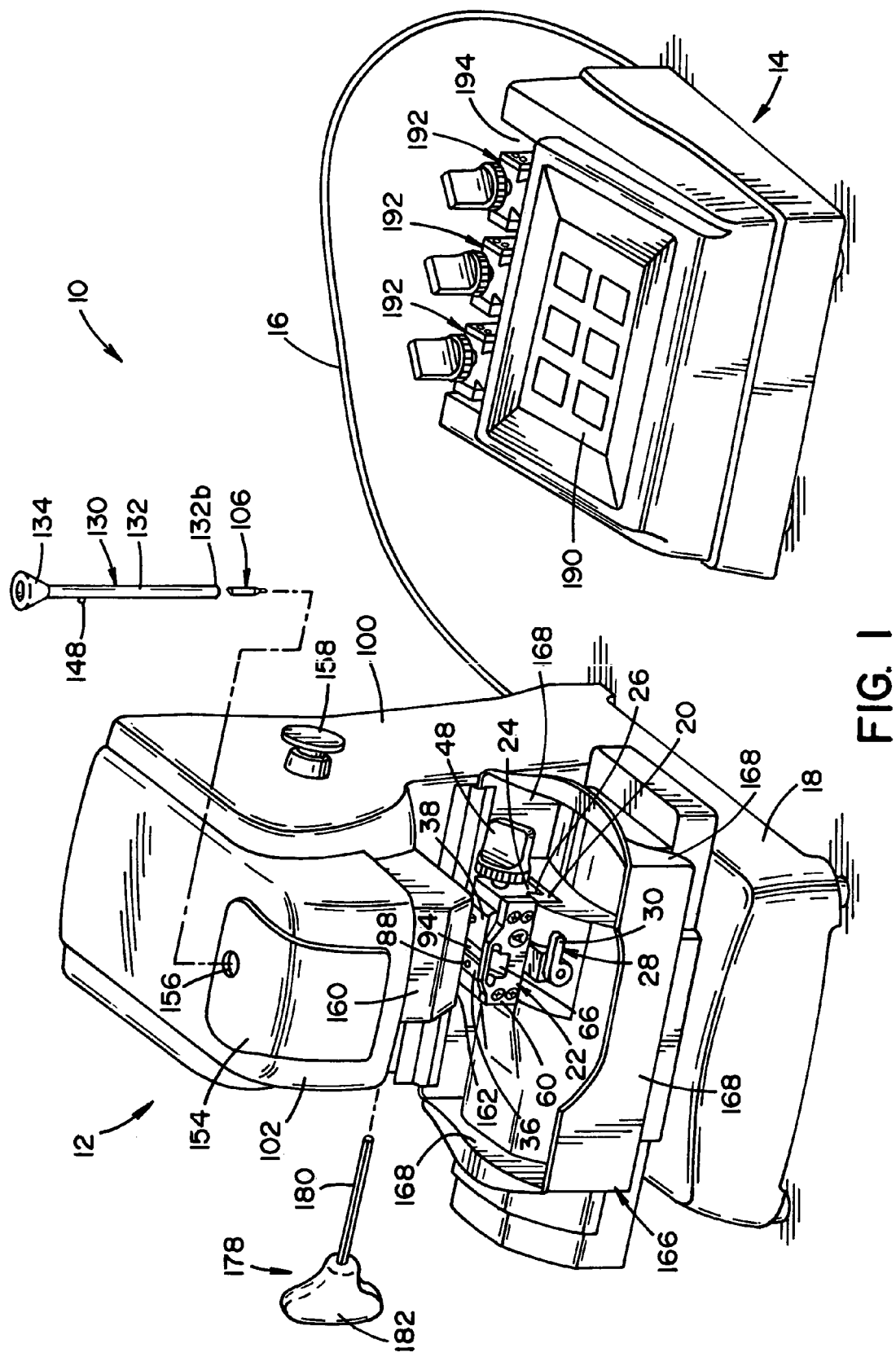
FIG. 1 is a perspective view of a key cutting machine arrangement including a key cutting machine (including a machining unit and a control unit), a stem for temporarily installing a milling cutter in the machine, and a tool for semi-permanently installing the milling cutter in the machine.

Referring now to the drawings wherein the showings are for purposes of illustrating one or more embodiments and are not to be construed as limiting the invention, a key cutting machine for the duplication or generation of keys by cutting is shown and generally designated by reference numeral 10. With specific reference to FIG. 1, the key cutting machine 10 of the illustrated embodiment includes an electromechanical machining unit 12 and a electronic control unit 14 in operative communication with the machining unit 12. The control unit 14 includes a memory device or memory means in which information, procedures and/or coded data concerning keys to be duplicated or generated are stored. The control unit 14 also includes control electronics or means to control cutting of key blanks. In the illustrated embodiment, the machining unit 12 and the control unit 14 are spaced apart from one another and are connected with each other via a data-transmission cable 16 for operative communication therebetween.

As will be appreciated by those skilled in the art, separation of the machining unit 12 from the control unit 14 allows the machining unit 12 to more compact, as it is not required to house the controlling elements contained in the control unit 14. Separation of the control unit 14 from the machining unit 12 also helps to prevent, or at least reduce the likelihood of, vibrations or irregular operating conditions occurring in the machining unit 12 from adversely impacting or interfering with proper operation of the control unit 14. Moreover, such separation allows the control unit 14 to be remotely positioned relative to the machining unit 12. Of course, as will be also be appreciated and understood by those skilled in the art, alternate arrangements, besides the illustrated embodiment, are possible and contemplated to be within the scope of the present invention.

For example, the control unit 14 could communicate with the machining unit 12 through any known means, such as wirelessly, over a network (such as the internet, an intranet, or any other type of network), via modem or other types of data-transmission means and/or devices, etc. In a further example, the control unit is, and/or could be contained within, some other type of computer or controlling device, such as a personal computer, handheld computer, etc. In one embodiment, the control unit could be integrated in a remote servicing, communication and/or data updating service. In still a further example, the control unit 14 could be integral with (i.e., not separate from and/or spaced from) the machining unit 12 such that the units 12,14 are housed in a single structure.

Returning to the illustrated embodiment of FIG. 1, the machining unit 12 includes a base-plate or base 18 upon which is mounted a carriage 20. The carriage 20 is slidable or moveable relative to the base-plate 18 along a horizontal plane generally disposed between the base-plate 18 and carriage 20 along rectilinear runners (arranged therebelow and not shown in the Figures). In an advantageous manner, particularly from an ergonomic point of view and in view of making the unit 12 still more compact, these runners are arranged in parallel pairs on a cross-shaped or component table, as is known to those skilled in the art.

The carriage 20 supports, or adapted to accommodate, a clamp or jaw 22. More particularly, the clamp 22 includes a protruding rib 24 that is received in a corresponding groove 26 of the carriage 20. A tightening grip assembly 28 having an actuating handle 30 selectively locks the clamp 22 in a fixed position on the carriage 20. The arrangement of the carriage 20 and the clamp 22 employed in the illustrated embodiment enables the clamp 22 to be easily removed, replaced and/or positioned on the carriage 20. Any type of suitable clamp can be used in conjunction with the carriage 20; however, the carriage 20 is particularly suitable for use in conjunction with the clamp or clamp assembly of the kind described in the above-referenced U.S. patent application entitled "CLAMP FOR A KEY CUTTING MACHINE," which is also like the illustrated clamp 22.

Figure 5:
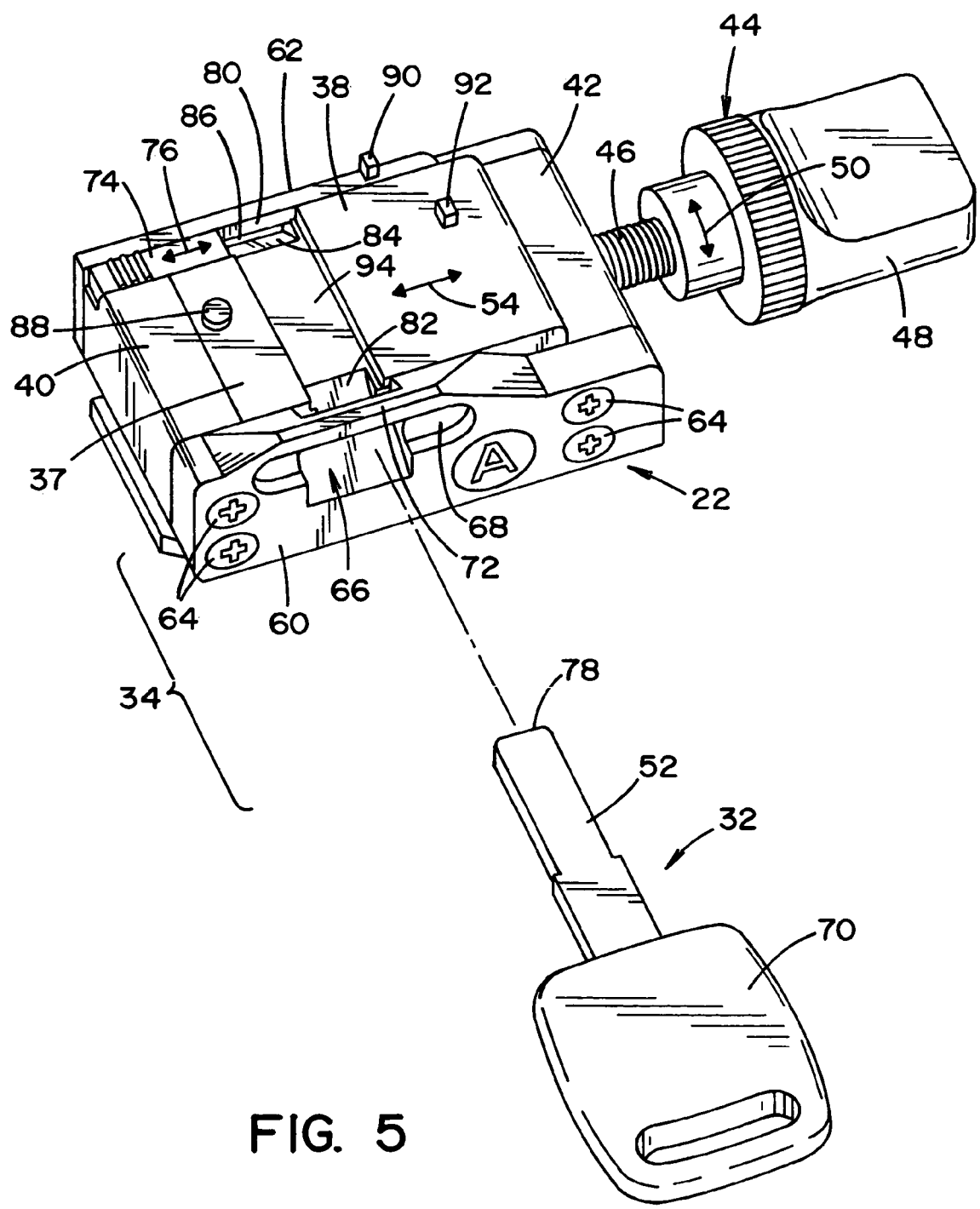
FIG. 5 is an enlarged perspective view of a clamp assembly of the machining unit of FIG. 1.

In particular, with additional reference to FIG. 5, the clamp 22 holds or clamps a key, such as key blank 32, for cutting, i.e., coding or ciphering, by the key cutting machine 10. The clamp 22 and key blank 32 can be together referred to as a clamping assembly or a key and clamp assembly 34. As described in more detail in the referenced clamp application, the clamp 22 includes means for identifying the key blank 32 as a correct match for the clamp and means for preventing the key blank 32 from tipping over during cutting thereof. For holding the key blank 32, the clamp 22 includes a pair of jaws, including fixed jaw 36 and moveable jaw 38, housed within a recess or accommodation defined between a pair of opposed shoulders 40,42.

The moveable jaw 38 is normally urged apart from the fixed jaw 36 by a biasing means or member (not shown); however, the moveable jaw 38 is forcibly moved toward the fixed jaw 36 against the urging of the biasing member by an adjustable locator device 44. In the illustrated embodiment, the locator device 44 includes a threaded pin 46 threadedly received through the shoulder 42 and a rotary handle 48 for turning the pin as indicated by bidirectional arrow 50. Rotation of the handle 48 in a first direction causes the pin to threadedly move into the moveable jaw 38 and force the same toward the fixed jaw 36 for purposes of holding or clamping the key blank 32, and more particularly a blade 52 of the key blank, when received between the jaws 36,38. Thus, as shown, the moveable jaw 38 is moveable in the direction of arrow 54 between a clamped position wherein the key blank 32 can be held between the jaws 36,38 and an unclamped position wherein the key blank can be inserted and removed from between the jaws.

Spanning the shoulders 40,42 and further enclosing the jaws 36,38 in the accommodation are a pair of opposed end plates, including first end plate 60 and second end plate 62. The end plates 60,62 are secured to the shoulders 40,42 (and/or a base portion from which the shoulders extend) by suitable fasteners, such as screws 64. The first end plate 60 includes a key insertion aperture 66 which, as described more fully in the related patent application, confirms that the key blank 32 is a correct match for the clamp 22 (by matching a notched portion 68 of the aperture 66 against a head portion 70 of the key blank 32). A bridge 72 defining or closing a top portion of the aperture 66 functions to prevent the key blank 32 from tipping when the key blank undergoes cutting by the cutting machine 10.

Other features of the clamp 22 include a moveable tip-abutment member 74 slidable in the direction of bidirectional arrow 76. The tip-abutment member 74 engages a tip or distal portion 78 of the key blank 32 when the key blank is relatively shorter and is removed from a protruding position so that the tip 78 can engage abutment portion 80 of the plate 62 when the key blank 32 is relatively longer. Still other features include sloped sections 82,84 that direct cutting or milling chips away from a cutting area of the key blank 32 through apertures, including aperture 66 and an opposing aperture 86, defined through the plates 60,62; a dowel or reference lug 88 extending slightly above the fixed jaw 36 for axial positioning of a cutter; and check members 90,92 for confirming clamp 22 is correct for the type of key selected on the control unit 14 for generation and/or duplication, confirming clamp 22 is properly positioned on the machining unit 12, and/or confirming a width of the key blank 32 or another cut key (such as when the tracer 108 traces an existing key).

In operation, the blade 52 of the key blank 32 is inserted through the key insertion aperture 66 and rested upon a surface 94 of the fixed jaw 36. Depending upon the length of the blade 52, the tip 78 contacts or is positioned adjacent one of the tip-abutment member 74 (in the protruding position) or the plate portion 80. With the key blank 32 inserted in the clamp 22, the handle 48 can then be rotated to clamp the blade 52 between the jaws 36,38. In this position, the key blank 32 can be cut by the key cutting machine 10 without risk, or at least with reduced risk, of the key blank 32 tipping.

With reference back to FIG. 1, the machining unit 12 further includes a column portion 100 extending upward from the base 18 and a head portion 102 supported by the column portion 100. The head portion 102 generally extends over and is positioned above the carriage 20. With additional reference to FIG. 2, within the head portion 102 there are mounted, in a vertical position, operating tools, including (i) a spindle 104 have a milling cutter 106 removably or selectively mounted thereto for rotation therewith and (ii) a tracer point or feeler 108.

Figure 3:
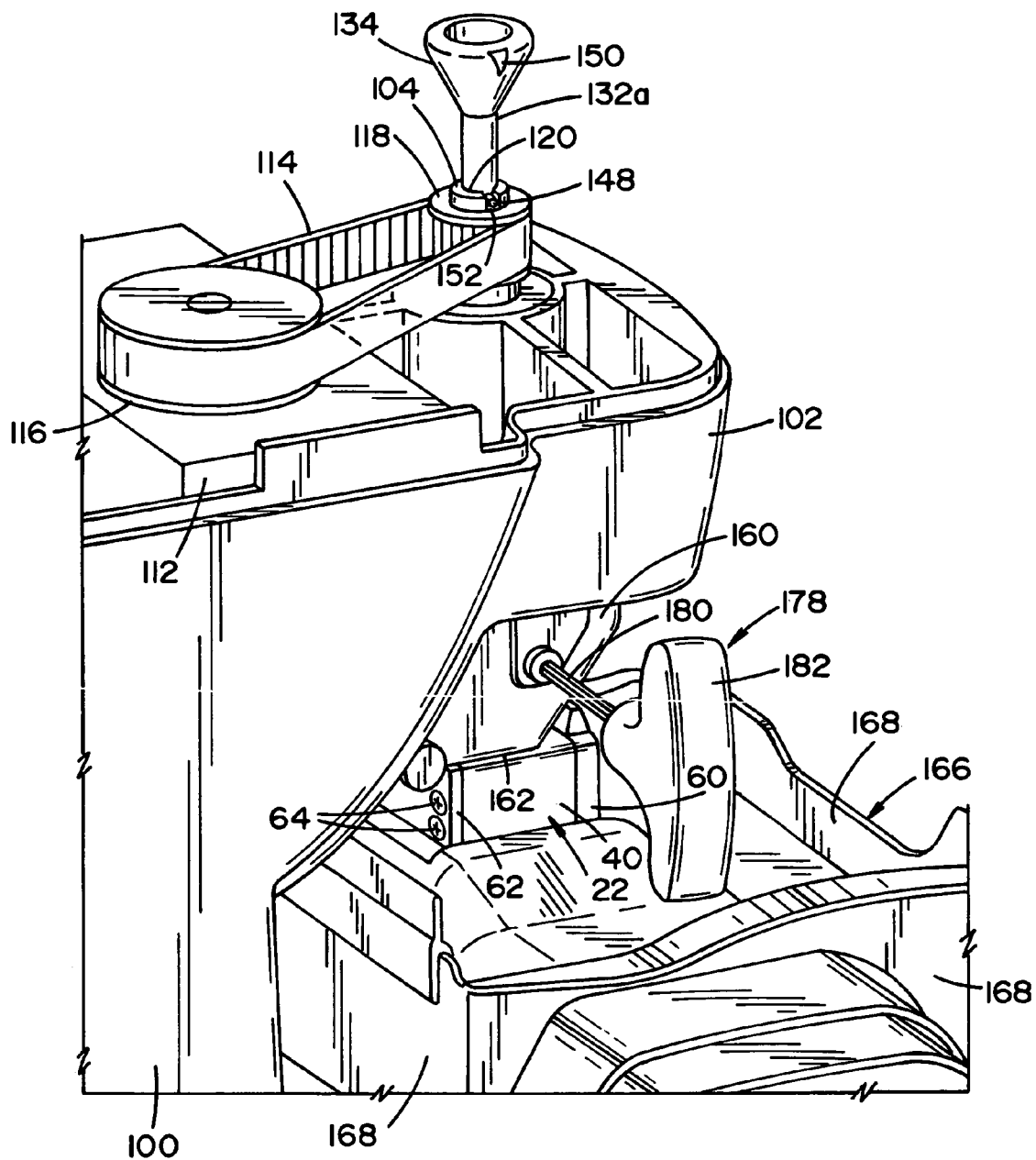
FIG. 3 is an enlarged partial perspective view of machining unit of FIG. 1 shown with a housing portion thereof removed.

Concerning the spindle 104, it is adapted to be driven rotatably about an axis 110 thereof. More particularly, with additional reference to FIG. 3, a driving arrangement for rotatably driving the spindle about axis 110 is housed within at least one of the column portion 100 and the head portion 102. As will be appreciated and understood by those skilled in the art, the driving arrangement can be a conventional driving arrangement. For example, in the illustrated embodiment, the driving arrangement includes a motor 112 that rotates the spindle 104 about the spindle's longitudinal axis 110 through a belt 114. More particularly, the motor 112 rotatably drives a motor pulley 116 which, through the belt 114, rotatably drives a spindle pulley 118. The spindle pulley 118 is fixedly and nonrotatably mounted to the spindle 104 such that rotation of the pulley 118 has the effect of rotating the spindle 104 therewith.

Figure 2:
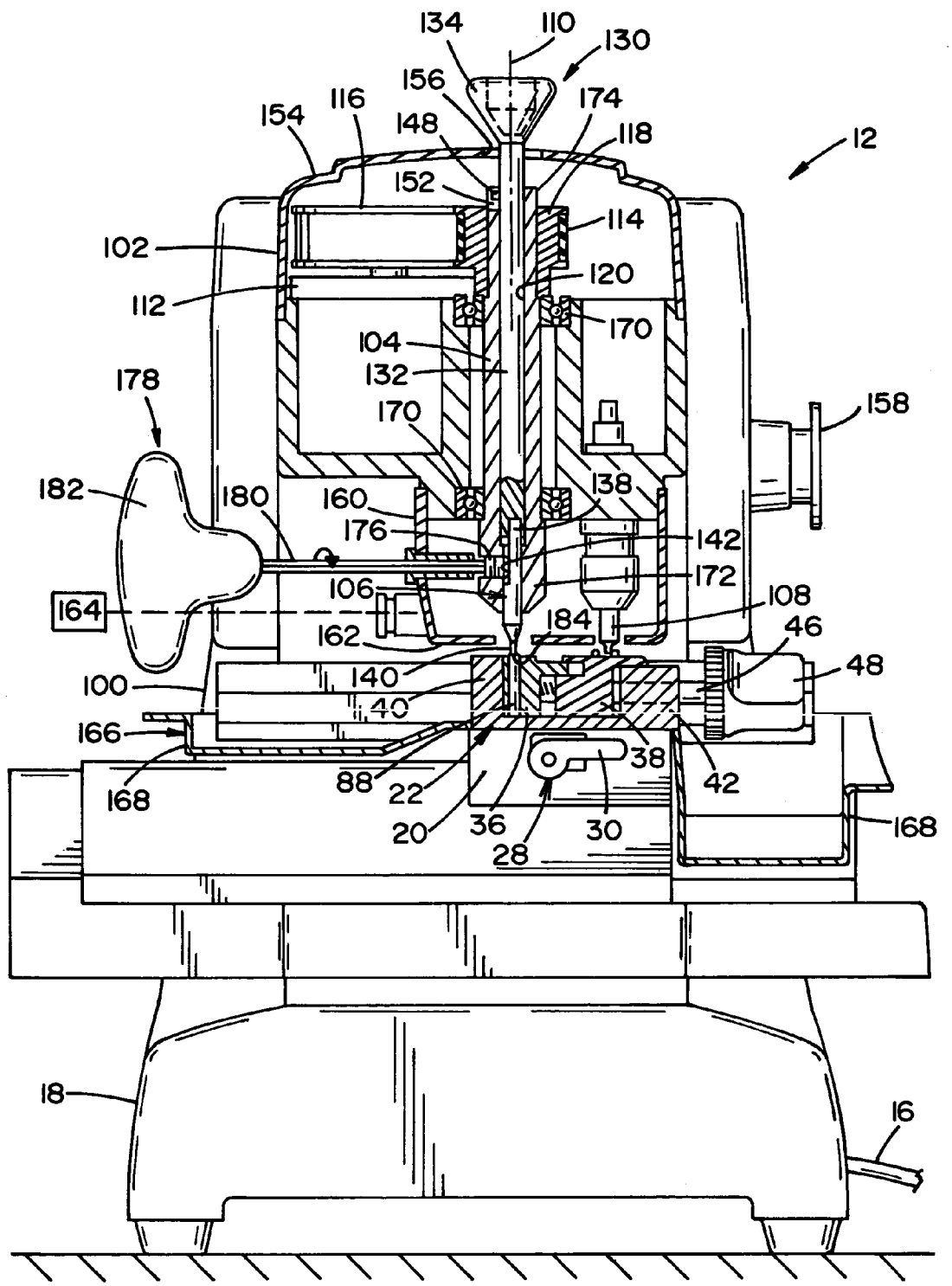
FIG. 2 is a vertical cross-sectional view of the machining unit of FIG. 1.

With specific reference back to FIG. 2, the spindle 104 has a bore 120 extending therethrough along an entire axial length of the spindle. As will be described in more detail below, the bore 120, also referred to herein as an axially extending throughbore 120 of the spindle 104, enables installation of the milling cutter 106 in an operative position without the need for the spindle 104 or any of the head portion 102 to be vertically movable. Specifically, the milling cutter 106 is selectively mountable in the bore 120 of the spindle 104 for rotation with the spindle. The movable carriage 20 is thus movable relative to the spindle 104 in the horizontal plane, described above, that is orthogonal relative to the axis 110.

Figure 4:
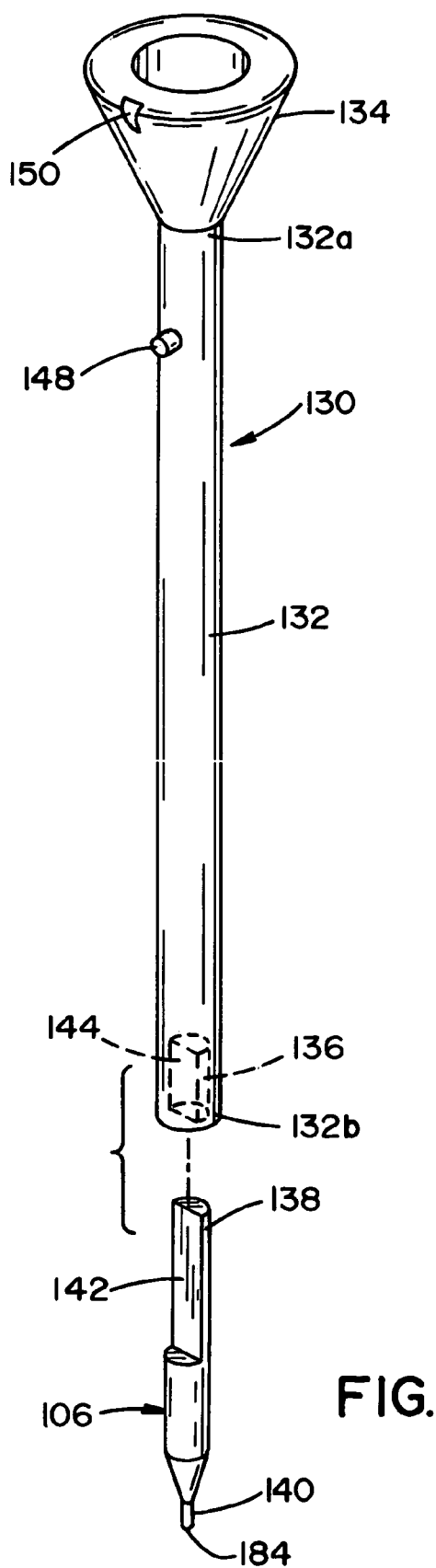
FIG. 4 is a perspective assembly view of the stem and milling cutter of FIG. 1.

With additional reference to FIG. 4, a stem or holding member 130 is provided for installing the milling cutter 106 in its operative position within the spindle 104. The stem 130 includes an elongated shaft portion 132 having an enlarged, frustoconical head portion 134 at one end 132a and a cutter recess 136 at an opposite end 132b. The recess 136 is appropriately shaped and sized to receive a non-cutting end 138, opposite a cutting end 140, of the milling cutter 106. The milling cutter 106 is generally axisymmetrical, except that, adjacent the non-cutting end 138, the cutter 106 includes a flat portion 142. A portion of the recess 136 is defined by a flat section 144 of the stem 130 to correspond to the flat section 142.

As already mentioned, the recess 136 is appropriately sized and shaped to receive, the milling cutter 106. More particularly, the recess 136 is sized relative to the milling cutter end 138 such that an interference-fit is created between the stem 130 and the cutter 106. The interference-fit allows temporary attachment of the milling cutter 106 to the stem 130 (i.e., the milling cutter 106 is snugly received in the recess 136 to secure the stem 130 and cutter 106 together until a sufficient axial pull-apart force is applied). Of course, as will be appreciated by those skilled in the art, other alternate temporary attachments and/or attachment means can be used to secure the cutter 106 to the stem 130, such as for example a magnetic coupling, and all such alternate temporary attachments and/or attachment means are to be considered within the scope of the present invention.

The shaft portion 132 is sized to fit axially within the throughbore 120 of the spindle 104 enabling the stem 130 to be selectively received in the throughbore 120. The shaft portion 132 includes a protruding lug or member 148 extending outward therefrom adjacent the frustoconical end 134 for radially aligning the stem 130 with the spindle 104 when the shaft portion 132 is received in the throughbore 120. The protruding member 148 is radially aligned with the flat section 144 that partially defines the recess 136. Indicia or other marking means 150 are included on the frustoconical end 134 and radially aligned with the flat section 144. With additional reference to FIG. 3, the spindle 104 includes a recess 152 adjacent an upper end thereof for receiving the protruding member 148.

With reference back to FIG. 1, the base portion 18, column portion 100 and head portion 102 together form a housing portion of the machining unit 12. A removable cover 154 is provided on the head portion 102 for providing access into the housing 18,100,102. The cover 154 defines a hole 156 that is aligned with the throughbore 120 of the spindle 104. Thus, the stem 130 is insertable in the hole 156 and into the throughbore 120. An operating control 158, such as a power control, can optionally be provided on the housing.

For enhanced operator safety, a stationary guard shroud can be provided on the head portion 102. Specifically, in the illustrated embodiment, such a shroud 160 depends from the head portion 102 and surrounds the milling cutter 106 and the tracer 108. A lower edge 162 of the shroud 160 extends adjacent or almost reaches a surface of the carriage 20 on which the clamp 22 is mounted. As will be appreciated and understood by those skilled in the art, the shroud 160 can optionally be connected to a chip vacuum device 164, illustrated schematically in FIG. 2.

Also for enhanced operator safety, the clamp 22 is contained within a pan 166 suitable for collecting milling chips that are created when the cutter 106 cuts or mills the key blank 32. The collecting pan 166 represents a further safety feature for the operator, since it contributes to more effective confinement of a working area (i.e., the area where the key blank 32 is cut by the cutter 106). With vertical side walls 168, the pan 166 constitutes a barrier against chips being capable of being ejected and scattering outside around the machining unit 12.

With reference now to FIG. 2, the spindle 104 is rotatably mounted by a plurality of bearings 170 and oriented such that a first spindle end 172 is adjacent the shroud 160 and/or the clamp 22 and a second spindle end 174 is adjacent the spindle pulley 118. A securing mechanism 176 disposed on the spindle 104 rigidly or fixedly (and nonrotatably) mounts the milling cutter 106 selectively to the spindle 164 when positioned adjacent the first spindle end 172 so that rotary motion of the spindle can be transmitted to the cutter.

In the illustrated embodiment, the securing mechanism 176 is a set screw that locks the milling cutter 106 against an inner wall of the spindle 104 that defines the throughbore 120. For securing or locking the cutter 106 to the spindle 104, the set screw 176 is rotated in a first direction (such as clockwise) and for unlocking the cutter from the spindle, such as for removal of the cutter from the spindle, the set screw 176 is rotated in a second direction (such as counterclockwise). A tool, such as hex wrench 178, can be provided for facilitating rotation of the set screw 176 in a desired direction. In the illustrated embodiment, the set screw 176 is a threaded member having a hexagonal tool recess therein and the tool 178 includes an elongated hexagonal tool shank 180 receivable in the tool recess and a handle 182 for rotating the shank and thereby the set screw 176.

As already mentioned, the tracer 108 is mounted to the head portion 102. The tracer 108 functions to confirm certain information concerning the clamp 22 as will be described in more detail below and, optionally, to track a bit notch pattern of an original key to be duplicated that is secured in another clamp (not shown) on the base plate 18. More particularly, the tracer 108, also referred to herein as a stylus, tracer point, or key follower, is permanently mounted or installed in the machining unit 12 in a generally fixed position and, therefore, does not require any adjustment when setting up the machining unit 12 for or preparing to cut the key blank 32. Permanent installation of the tracer 108 in a fixed position represents an important advantage of the machining unit 12 since it does away with any need for the operator to tamper with or, anyway, handle the tracer 108.

To install the cutter 106 in the machining unit 12, the cutter's non-cutting end 138 is inserted or frictionally fit into the recess 136 to temporarily connect the cutter 106 to the stem 130. With the milling cutter 106 attached to the stem's lower end 132b, the stem 130 is inserted into the hole 156. Then, the stem 130 is axially inserted into the spindle second end 174, i.e., into the throughbore 120, to position the milling cutter 106 adjacent the first spindle end 172. With the clamp 22 already positioned on the machining unit 12, setting or proper positioning of the milling cutter 106 occurs, in view of accurately and correctly positioning it relative to the key blank 32 secured in the clamp 22, by causing the stem 130 to slide axially inside the spindle 130 until a tip or distal end 184 of the cutter 106 contacts or engages the clamp 22.

In the illustrated embodiment, the clamp 22 includes the protruding dowel 88 aligned with the throughbore 120 so that contact of the cutter 106 with the clamp 22 occurs when the distal end 184 contacts an upper surface of the dowel 88, defining a reference plane of the clamp assembly 34, which precisely positions the cutter 106 relative to the key blank 32. As should be appreciated, the stem 130 has an axial length that is sufficient or allows the milling cutter 106 to be brought into contact with the dowel 88. Thus, contact by the distal end 184 with the dowel 88 serves to properly set the cutter 106 along the axis 110.

Radial alignment of the cutter 106 occurs by radially positioning the stem 130 so that the protruding member 148 is aligned with and then is received by the recess 152 when the stem is inserted in the throughbore 120. The indicia 150 on the stem's frustoconical end 134 can be used to sight radial alignment between the stem 130 and the spindle 104 by the operator. In particular, radial alignment of the stem 130 within the spindle 104 causes alignment of the flat section 142 of the cutter 106 with the securing mechanism 176. This alignment enables the mechanism 176 to be threadedly advanced into the cutter 106 to fixedly and nonrotatably secure the cutter 106 to the spindle 104. As already described, the tool 178 can be used to assist in rotating the mechanism 176 to lock the cutter 106.

Once the milling cutter 106 is locked or rigidly mounted to the spindle 104 by the securing mechanism 176, the stem 130 can be axially removed from the spindle 104 and, more particularly, the spindle throughbore 120. More particularly, a sufficient axial pull-apart force is applied to the stem 130 which causes separation of the stem 130 from the cutter 106 (i.e., disengaging or disconnecting the temporary interference-fit between the stem and cutter). The securing mechanism 176 maintains the cutter 106 in the desired set position as the stem 130 is removed from the machining unit 12. If employed, the tool 178 is also removed from the machining unit 12.

The particular features of the illustrated embodiment described herein eliminate or at least reduce any previously required fine-setting and/or adjustment operations, particularly those that required the operator to make use of special reference provisions, tools and gauges for correctly positioning a milling cutter along a longitudinal axis coaxial therewith. Thus, the sole operation an operator is required to do in setting up the machining unit 12 is to simply insert the cutter 106 into the spindle 104 with the assistance of the stem 130 until the cutter contacts the clamp 22 and use the securing mechanism 176 to lock the cutter in operative cutting position. Thus, the operator is able to directly and readily achieve correct setting and adjustment of the milling cutter 106. Therefore, for the machine 10 to be ready for operation, all it takes is to only align the milling cutter 106 with the clamp 22 along two orthogonal axes in the working plane, and this alignment is brought about by the machine 10 automatically based on the instructions stored in the memory device of the electronic unit 14.

Moreover, the machining unit 12 no longer needs a vertically movable carriage for positioning, setting and adjusting the tools 106,108. Rather, the cutter 106 is fixedly secured within the head portion 102 in a simple one-step installation process and the tracer point 108 remains permanently installed in the head portion 102. This enables the machining unit 12 to be simplified to a significant and considerable extent in its overall construction. Furthermore, ergonomics of a cutter replacement operation are significantly improved, at least in part due to the elimination of a heretofore often required step of inserting a cutter through a lower end portion of a spindle, which was awkward due to limited space.

Once the cutter 106 is locked to the spindle 104 and the stem 130 and tool 178 are removed from the machining unit 12, the cutting operation on the key blank 32 secured in the clamp 22 can begin. In one embodiment, the control unit 14 is provided with an interactive operable display 190 of the so-called touch-screen type to set and check the operating parameters of the machining unit 12. In particular, an operator selects a specific key to be made from the key blank 32 on the control unit 14. For example, in one embodiment, the operator might select a specific type of vehicle key to be made by selecting a desired vehicle make, model and year and a type of cutting function, such as cut a new key or make a duplicate from an existing key, from the touch-screen display 190. The control unit 14 then functions to control cutting of the key blank 32 by the milling cutter 106. More specifically, the control unit 14 controls movement of the carriage 20 relative to the milling cutter 106 to cut the key blank 32 clamped by the clamp 22 for creating a key with a desired (or the selected) bit notch pattern.

In one embodiment, the machining unit 12 controlled and operated by the control unit 14 first confirms that the clamp 22 is a proper clamp and that the key blank 32 is a proper key blank for the key to made or copied, as selected on the control unit 14, prior to cutting of the key blank 32. More particularly, the carriage 20 on which the clamp 22 is mounted is moved so that the tracer 108 contacts two sides of the clamp's check member 90 to verify that the correct clamp, relative to the key selected on the touch-screen display 190, has been properly installed on the carriage 20. By touching or contacting either side of check member 90, the key cutting machine 10 can confirm if the clamp 22 is located properly in position thereon and that the correct clamp is being used for the type of key selected.

Should the clamp 22 not be properly in position or not be appropriate for the type of key selected, an appropriate indication or notification can be conveyed to the operator on the display screen 190. Confirmation of clamp 22 being a correct clamp can be done by having the check member 90 of the clamp 22 have specific measurements or dimensions relative to other clamps 192 corresponding to other keys to be made, copied and/or duplicated. Such other clamps 192, of varying sizes for varying keys to be made, can be stored in one or more of a plurality of receptacles 194 provided on the control unit 14. In particular, it has been found that four types of clamps can be enough to allow for the totality of laser-type keys currently used by car manufacturers to be duplicated, which further makes possible for the whole machine 10 to be made still more compact and simple. In a similar manner, the check member 92 can be used or engaged by the tracer 108 to confirm that the width of the key blank 32 is as expected for the selected key. If incorrect, an appropriate indication or notification can be conveyed to the operator on the display screen 190.

The exemplary embodiment has been described with reference to the embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A key cutting machine for the cutting of keys, comprising:
   a spindle adapted to be driven rotatably about an axis thereof, said spindle having an axially extending throughbore;
   a milling cutter selectively mountable in said throughbore for corotation therewith;
   a carriage for supporting a clamp assembly wherein a key blank is clamped for cutting by said milling cutter, said carriage movable relative to said spindle in a plane that is orthogonal relative to said axis;

a securing mechanism disposed on said spindle for rigidly mounting said milling cutter to said spindle when said milling cutter is positioned adjacent a first spindle end; and a stem selectively receivable in said throughbore by axial insertion of said stem and said milling cutter into a second spindle end to position said milling cutter adjacent said first spindle end, said stem removable from said throughbore after said milling cutter is rigidly mounted to said spindle by said securing mechanism.

2. The key cutting machine of claim 1 further including:

a mechanical machining unit having a motor for rotatably driving said spindle about said axis; and an electronic control unit having a memory device for storing coded key data for cutting of keys by said mechanical machining unit; said electronic control unit in operative communication with said mechanical machining unit to control cutting of keys by said milling cutter.

3. The key cutting machine of claim 2 wherein said control unit is separated or spaced from said mechanical machining unit and is connected to said mechanical machining unit via a data-transmission line.

4. The key cutting machine of claim 3 wherein said control unit includes a plurality of receptacles for receiving a plurality of different sized clamp assemblies, including said clamp assembly.

5. The key cutting machine of claim 2 wherein said electronic control unit controls movement of said carriage relative to said milling cutter to cut the key blank clamped by said clamp assembly for creating a key with a desired bit notch pattern.

6. The key cutting machine of claim 1 wherein said stem has a length that allows said milling cutter to be brought into contact with a reference plane of said clamp assembly when positioning said milling cutter adjacent said first spindle end for rigid mounting of said milling cutter to said spindle by said securing mechanism so as to directly and readily achieve correct setting and adjustment of said milling cutter.

7. The key cutting machine of claim 1 wherein said stem has an axial recess adjacent a stem distal end for temporary attachment of said milling cutter.

8. The key cutting machine of claim 1 further including a tracer or key follower for tracking a bit notch pattern of an original key to be duplicated.

9. The key cutting machine of claim 8 wherein said guard shroud is connected to a chip vacuum device for the removal and collection of milling chips.

10. The key cutting machine of claim 1 wherein said clamp assembly includes a reference lug that enables said milling cutter to be properly set along said axis.

11. The key cutting machine of claim 1 wherein said milling cutter is enclosed within a stationary guard shroud having a free edge which extends to adjacent said clamp assembly supported on said carriage.

12. The key cutting machine of claim 1 wherein said carriage on which said clamp assembly is supported is contained in a pan for collecting milling chips.

13. A key cutting machine, comprising:

a rotatably mounted spindle having a throughbore extending from a spindle first end to a spindle second end;

a clamp assembly holding a key blank for cutting by a milling cutter rotatably mounted to said spindle in said throughbore adjacent said spindle first end;

an elongated stem insertable into said throughbore with said milling cutter temporarily attached at one end of said stem to position said milling cutter adjacent said spindle first end after insertion of said stem and said milling cutter into said spindle second end; and a securing mechanism selectively locking said milling cutter to said spindle when said stem positions said milling cutter adjacent said spindle first end.

14. The key cutting machine of claim 13 further including:

a carriage to which said clamp assembly is mountable, said carriage movable relative to said spindle in a plane that is orthogonal relative to an axis of said spindle.

15. The key cutting machine of claim 13 further including:

a belt frictionally engaged to said spindle for selective rotation thereof upon actuation of a motor that drives said belt.

16. The key cutting machine of claim 13 wherein said clamp assembly includes a surface that a distal end of said milling cutter is positioned against when said milling cutter is inserted into said spindle by said stem to position said milling cutter adjacent said spindle first end.

17. The key cutting machine of claim 13 wherein said stem includes a protruding member and said spindle includes a recess that receives said protruding member to radially align said stem with said spindle.

18. The key cutting machine of claim 13 wherein said spindle with said milling cutter secured thereto is not vertically movable and said milling cutter is positioned relative to said clamping assembly by engagement of said milling cutter with said clamping assembly while said milling cutter is temporarily attached to said stem.

19. The key cutting machine of claim 13 further including a radial alignment device that facilitates radial alignment between said stem and said spindle to radially position said milling cutter relative to said securing mechanism.

20. A method for installing a milling cutter in a key cutting machine in an operable position, comprising:

attaching a milling cutter to one end of an elongated stem;

inserting said one end of said elongated stem with said milling cutter attached thereto into a spindle second end of a spindle of a key cutting machine to position said milling cutter adjacent a spindle first end;

securing said milling cutter positioned adjacent said spindle first end to said spindle;

removing said stem from said spindle; and rotatably driving said spindle and said milling cutter secured thereto to cut a key blank into a key.

21. The method of claim 20 further including:

moving said key blank in a plane orthogonal relative to an axis of said spindle to cut said key blank into said key.

* * * * *